May 16, 1939.          C. J. PETTERSON                2,158,801
                    VENTILATED SEAT FOR VEHICLES
                        Filed Jan. 31, 1936

INVENTOR.
Charles J. Petterson
BY
ATTORNEYS.

Patented May 16, 1939

2,158,801

UNITED STATES PATENT OFFICE 2,158,801

VENTILATED SEAT FOR VEHICLES

Charles J. Petterson, Pasco, Wash.

Application January 31, 1936, Serial No. 61,643

2 Claims. (Cl. 98—2)

This invention relates to a ventilating seat cushion for vehicles, the object, generally stated, being to provide especially advantageous means whereby a current of air, either for cooling or heating purposes, may be supplied to the cushion upon which the occupant of a vehicle is seated.

More particular objects and advantages will, together with the foregoing, become apparent in the course of the following detailed description and claims, the invention consisting in the novel construction, adaptation, and combination of parts hereinafter described and claimed.

Figure 1:
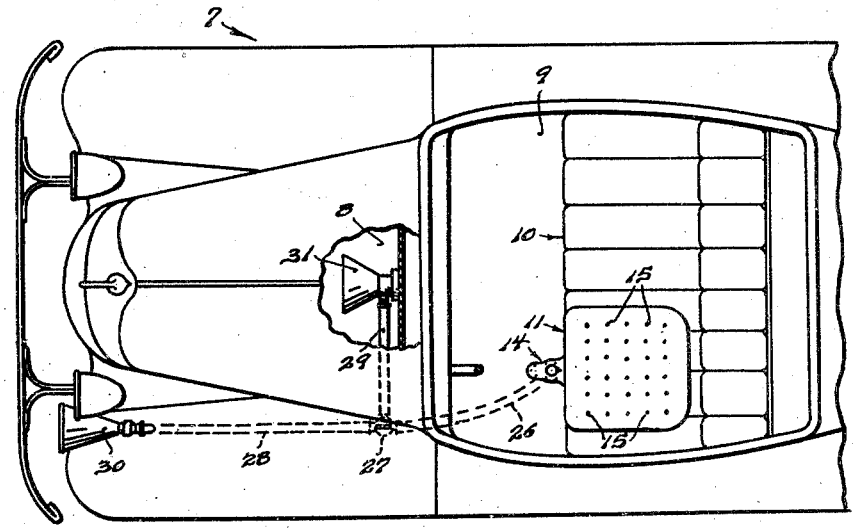
Figure 1 is a somewhat diagrammatic plan view whereby to expose the interior of an automotive vehicle in representing the relationship between the vehicle and the illustrated preferred embodiment of the present invention.
Figure 2:
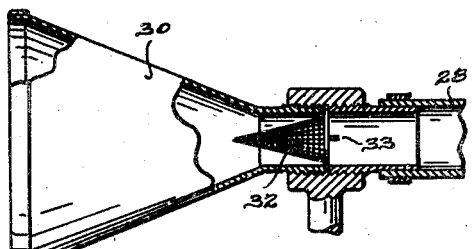
Fig. 2 is an enlarged detail side elevational view, parts being shown in section, to indicate the funnel arrangement which preferably is employed as a means of trapping a pressure current of air for delivery of the same to the ventilating cushion.
Figure 4:
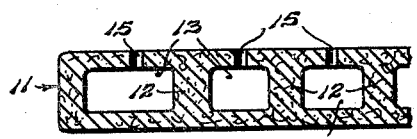
Fig. 4 is an enlarged transverse vertical section taken on the line 4—4 of Fig. 3.
Figure 5:
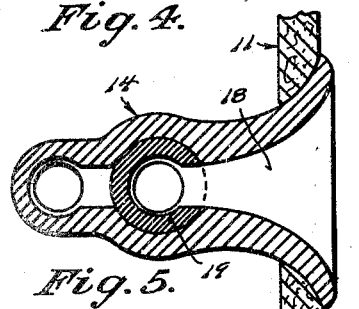
Fig. 5 is a detail horizontal section representing valve structure employed with the cushion.
Figure 3:
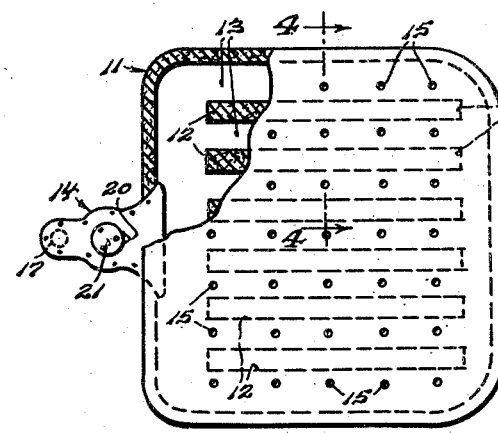
Fig. 3 is a plan view of the cushion with parts broken away and shown in section.
Figure 6:
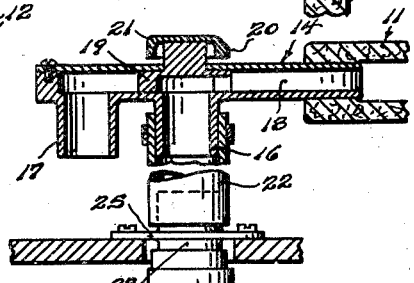
Fig. 6 is a fragmentary longitudinal section through the valve and cushion, related parts of the vehicle being indicated in the view.

With reference being had to the drawing, the numeral 7 designates an automotive vehicle providing a motor compartment 8 and a passenger compartment 9, in the latter of which is a seat 10 for supporting the vehicle occupants.

According to the present invention I provide, preferably for each of the vehicle occupants (one only being shown), a hollow cushion 11 indicated as being independent of the vehicle seat and removably received over the same, the cushion being desirably of sponge rubber or other similar material formed interiorly with parallel rib elements 12 terminating in spaced disposition of the cushion's end walls whereby to define a plurality of connecting air channels 13, the forward wall of the cushion having an opening in which a valve member 14 is received as an integral part of the cushion. Disposed relatively on the longitudinal median line of the respective channels, the upper wall of the cushion provides a multiplicity of perforate openings 15.

As indicated, the valve member provides nipple extensions 16 and 17 in the under side disposed to communicate with an air passage 18 open at its inner end to the cellular chamber of the cushion, said nipple 16 constituting an air admission port to a valve chamber provided by member 14 at the approximate mid-length of the passage 18. Acting to communicatively connect the air admission port with the cushion cells or the nipple 17, selectively, a three-way cock 19 is received in said valve chamber, the handle 21 therefor being formed with a pointer 20 to facilitate regulation.

Indicated at 22 is a flexible tube received over the nipple 16 and at its opposite end engaging a coupling 23 extending through an opening in the floor-board of the vehicle, the coupling providing a suitable closure plate 25 for sealing the opening about the same and acting as a connection between the tube 22 and a tube 26 leading from a valve indicated by dotted lines 27 in Fig. 1. Leading to said valve 27 and rendered selectively operative for delivering air to the tube 26 are a pair of tubes 28 and 29 extending from horn-shaped air-trapping members 30 and 31 supported at the forward end of the vehicle and within the motor compartment, respectively. Funnel member 30 operates, in a manner believed obvious, to trap cool air and deliver a pressure current of the same under the influence of vehicle momentum either to the interior of the cushion 11 for discharge through the perforate openings 15 or to the exhaust opening of the nipple 17, funnel member 31 acting to trap motor-heated air and similarly deliver the same under the pressure influence of the fan. Any suitable or desired air-screening appliance may be employed with the arrangement and while for simplicity of illustration I represent a fine-mesh cone element 32 carried at the inner end of the funnel member, a water-containing chamber may advantageously be employed in accord with known practice for washing the air delivered through the tube 26. Illustrated in conjunction with the screen 32 is a projecting pin element 33 designed for use with the conventional air hose available in service stations for opening the check-valve of the same in obtaining a pressure jet of air for cleaning the screen.

The invention obviously permits of the use of fans receiving power from the vehicle engine or from an electric motor to operate as blowers for supplying pressure currents of ventilating air and as obviously allows the use of a cellular cushion devoid of surface openings and through which the air is circulated. Particularly as respects the advantages of the perforate openings 15, however, it is to be pointed out that extended drives are made considerably more comfortable for the vehicle occupants where the seat is ventilated from the fact that excessive perspiration is eliminated through the effective evacuation of skin excretions. Where such is desirable, it is further believed well within the spirit of the invention to heat the air, for winter driving, by means such as the conventional heaters now employed, the present invention being particularly directed to the provision of a most effective distribution of either cool or heated air.

In operation, the valve 27 is regulated to communicatively connect the funnel 30 with the cushion, or the funnel 31, according as to whether summer or winter conditions prevail. Cock 19 may be closed or regulated to communicatively connect the air-admission port with the cushion cells, in which event a current of ventilating air is discharged from the perforate openings 15, or with the nipple 17, resulting in the delivery of a pressure current of air over the floor portion of the passenger compartment. It is found that normal driving speeds provide an ample air supply sufficient to accommodate independent cushions for each of the occupants of a five-passenger vehicle.

It is my intention that the appended claims be given a breadth in their construction commensurate with the scope of the invention within the art.

What I claim, is:

1. A ventilation system for vehicles comprising the combination of a chambered seat cushion having air-admission and air-delivery openings to and from the same, an air-conduit, by which a pressure current of air is supplied, provided with independent leads for directing the air into the interior of the seat cushion and indirectly therefrom through the air-delivery openings into the interior of the vehicle or directly into the interior of the vehicle, and a valve in said air-conduit by which the air is caused to pass through either of said leads selectively.

2. A seat cushion for the occupant of a vehicle comprised of a flexible chambered member provided with an opening thereto operative to receive a connection leading from a pressure source of air supply and having the side, end, and bottom walls otherwise imperforate, the cushion, within the chamber, providing a plurality of resilient ribs lying in spaced relation for opposing the depressing influence of an occupant's weight and having the upper sustaining wall formed with a multiplicity of outlet ducts leading from the several cells formed between the ribs for venting the pressure body of air fed into the cushion through the admission opening.

CHARLES J. PETTERSON.